United States Patent
Waidhofer et al.

(10) Patent No.: US 9,910,767 B2
(45) Date of Patent: Mar. 6, 2018

(54) LEVERAGING INSTRUCTION RAM AS A DATA RAM EXTENSION DURING USE OF A MODIFIED HARVARD ARCHITECTURE PROCESSOR

(71) Applicant: Toshiba Memory Corporation, Minato-ku, Tokyo (JP)

(72) Inventors: Gordon Waidhofer, Irvine, CA (US); Christopher Delaney, Orange, CA (US); Leland Thompson, Tustin, CA (US)

(73) Assignee: Toshiba Memory Corporation, Tokyo (JP)

( * ) Notice: Subject to any disclaimer, the term of this patent is extended or adjusted under 35 U.S.C. 154(b) by 197 days.

(21) Appl. No.: 14/571,070

(22) Filed: Dec. 15, 2014

(65) Prior Publication Data

US 2016/0172014 A1    Jun. 16, 2016

(51) Int. Cl.
*G06F 12/02* (2006.01)
*G06F 12/06* (2006.01)

(52) U.S. Cl.
CPC .......... *G06F 12/02* (2013.01); *G06F 12/0284* (2013.01); *G06F 12/023* (2013.01); *G06F 12/0638* (2013.01); *G06F 2212/1044* (2013.01)

(58) Field of Classification Search
CPC .............................. G06F 12/02; G06F 12/0292
USPC ......................................................... 711/106
See application file for complete search history.

(56) References Cited

U.S. PATENT DOCUMENTS 9,092,327 B2 *  7/2015  De ...................... G06F 12/0638

OTHER PUBLICATIONS

"Xtensa Customizable Processors", Cadence IP, URL: http://ip.cadence.com/ipportfolio/tensilica-ip/xtensa-customizable, originally published Apr. 26, 2014, 10 Pages.
"Tensilica", Wikipedia, URL: https://en.wikipedia.org/wiki/Tensilica, originally published Feb. 4, 2010, 3 Pages.
"What is the Difference Between a von Neumann Architecture and a Harvard Architecture?", ARM Technical Support Knowledge Article, pp. 1-2, Sep. 9, 2008.

* cited by examiner

*Primary Examiner* — Jae Yu
(74) *Attorney, Agent, or Firm* — White & Case LLP (57) ABSTRACT

On-chip instruction RAM is leveraged as an extension of on-chip data RAM during normal use of a modified Harvard Architecture processor. Unused space in an instruction RAM is detected in a modified Harvard Architecture processor. During operation of the processor this unused space is used to load and store data normally loaded and stored in an on-chip data RAM. A performance penalty associated with swapping out to external memory is reduced. The type of data stored in the unused portion of the instruction RAM may be selected to optimize performance. In one implementation, the unused space in the instruction RAM is used to load and store only a single type of data, such as heap, stack, initialized or uninitialized data.

24 Claims, 9 Drawing Sheets

Modified Harvard Architecture: Normal Operation

LEVERAGING INSTRUCTION RAM AS A DATA RAM EXTENSION DURING USE OF A MODIFIED HARVARD ARCHITECTURE PROCESSOR

FIELD OF THE INVENTION

The present invention is generally related to reducing a performance penalty in a modified Harvard Architecture processor associated with having to access external DRAM after the capacity of an on-chip data RAM is exhausted. More particularly, the present invention is directed to using available instruction RAM space to load and store data as an extension of data RAM.

BACKGROUND OF THE INVENTION

Figure 1:
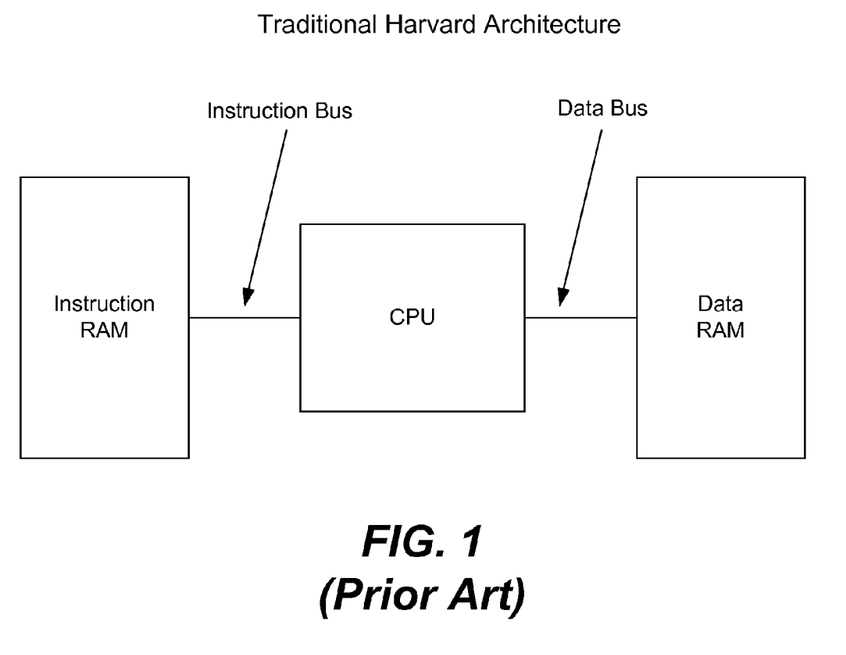
FIG. 1 illustrates a Harvard Architecture processor in accordance with the prior art.

FIG. 1 illustrates the Harvard computer architecture, which is a processor architecture having physically separate storage and signal pathways for instructions and data. FIG. 1 shows the traditional Harvard architecture with a central processing unit (CPU) having two separate buses, an instruction bus connected to instruction memory and a data bus connected to data memory. Being physically separate buses, operations to and from each bus can proceed in parallel, so that an instruction fetch may be done at the same time as data being read from and written to the data memory.

Figure 2:
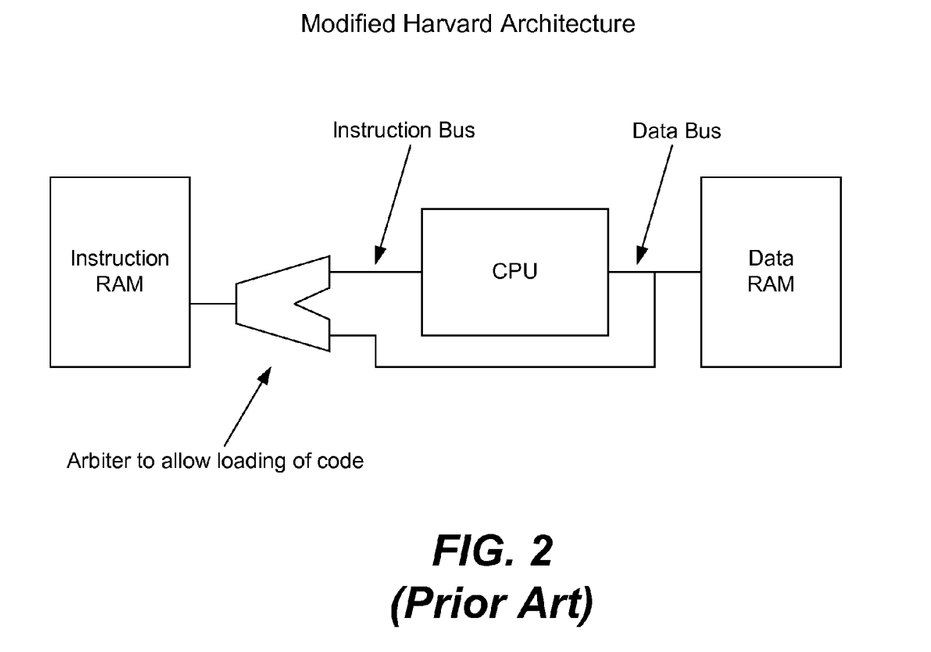
FIG. 2 illustrates a modified Harvard Architecture processor in accordance with the prior art.

In practice, many processors implement a modified Harvard architecture, as illustrated in FIG. 2. An arbiter is inserted between the processor and the instruction memory to allow access to the memory from either the instruction bus or data bus (the arbiter will allow access from either, but not both at the same time). In an Application Specific Integrated Circuit (ASIC) implementation, a modified Harvard Architecture ASIC includes one or more CPU cores. Each CPU core typically has two Static Random Access Memories (SRAMs) instantiated, one for instructions ('instruction RAM') and one for data ('data RAM'). Additionally, the ASIC has a memory interface (not shown) to access external memory, such as DRAM (Dynamic RAM) memory. An example of a commercial modified Harvard Architecture Processor is the Tensilica Xtensa™ architecture, where Tensilica™ is part of Cadence Design Systems of San Jose, Calif.

The modified Harvard architecture allows the contents of the instruction memory to be accessed as if it were data. As is well known, a modified Harvard Architecture has the characteristics that 1) instruction and data memories occupy different address spaces; and 2) instruction and data memories have separate hardware pathways to the central processing unit that allow instructions to be fetched and data to be accessed at the same time.

Figure 3:
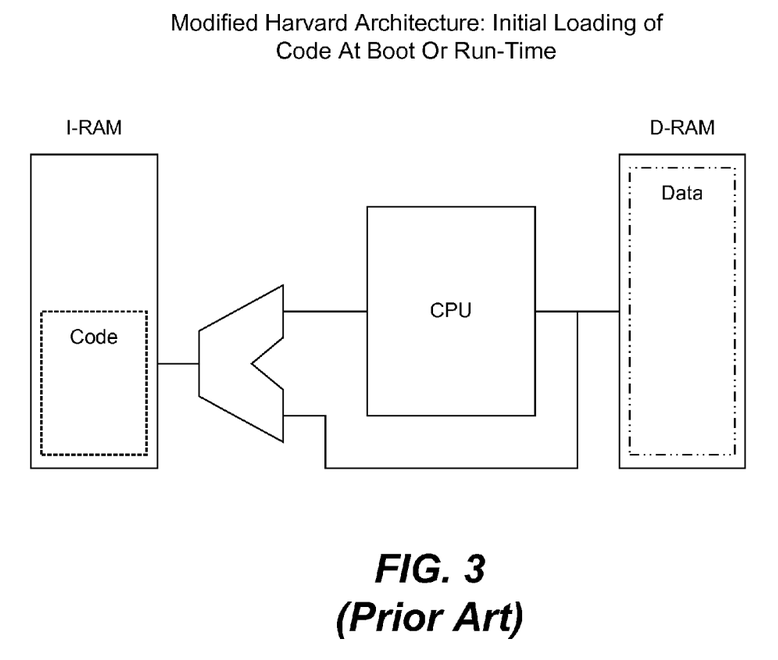
FIG. 3 illustrates an initial loading of code into an instruction RAM of a modified Harvard Architecture processor in accordance with the prior art.

In a modified Harvard Architecture processor, the instruction RAM is only used for code during normal runtime operations while providing options to perform initial loading of program coding into the instruction RAM. As shown in FIG. 3, one advantage of a modified Harvard Architecture is that it permits convenient initial or run-time loading of program code into the instruction RAM (I-RAM in the Figure) using data memory store instructions, as opposed to having fixed program code in ROM. Additionally, reading back of program code using data memory load instructions is provided in order to test and verify that the program code has been stored correctly. For example, the Tensilica Xtensa™ architecture has an "Instruction Memory Access Option" which when enabled, allows certain load and store instructions to address instruction RAM or ROM for testing and verification purposes. Tensilica™ teaches that this option is used only for testing and verification because it results in operations becoming significantly slower with a large drop in performance.

Figure 4:
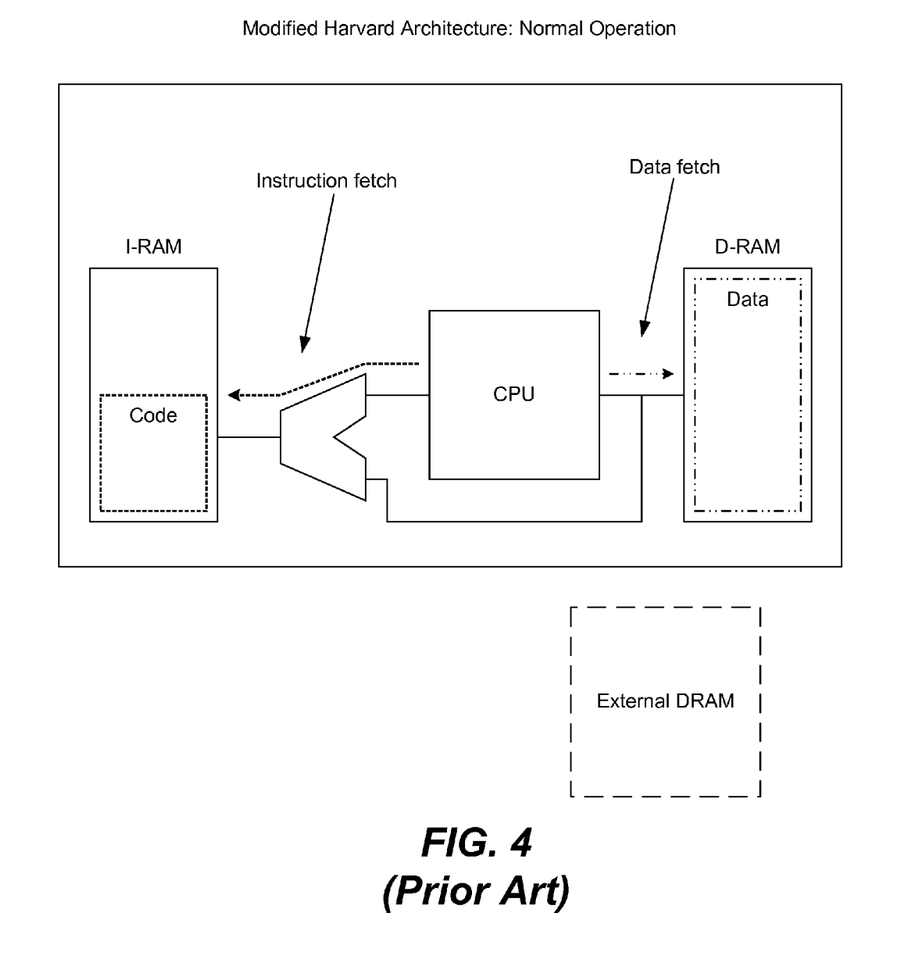
FIG. 4 illustrates normal operation of a modified Harvard Architecture processor in accordance with the prior art.

FIG. 4 shows that normal Harvard-style operation can proceed once the program code is loaded and running Instruction fetch cycles on the instruction bus can proceed in parallel with data load/store cycles on the data bus.

Careful design can fit the majority of local data structures in the on-chip data RAM, but when hundreds or thousands of these structures need to be instantiated at any given time, the 64 KB of available space is quickly consumed, and alternate storage is required.

As indicated by the dashed box, external Dynamic Random Access Memory (DRAM) is typically employed when more data space is needed than can be handled by the on-chip data RAM. The standard method to manage this situation is to swap out inactive data structures to external DRAM via a DRAM interface. On chip data RAM is generally implemented using Static RAM (SRAM) which is much faster than DRAM and therefore a considerable performance impact is incurred when accessing external DRAM instead of on-chip SRAM.

The present invention was developed in view of the shortcomings of conventional modified Harvard Architecture processors.

SUMMARY OF THE INVENTION

An apparatus, system, and method of using a modified Harvard Architecture Processor are disclosed. An on-chip instruction RAM is used to store code but may have available unused space that can be used for local data structures used by a CPU, such as data structures for load and store instructions. In one embodiment, strategic use of available space in an instruction RAM of a modified Harvard Processor Architecture is performed during normal use of the processor, and not during a test or verification process.

The available space in the instruction RAM is detected and used by the processor to load and store data that would ordinarily be stored in an on-chip data RAM to reduce a performance penalty associated with having to access off-chip memory. In one embodiment, a selection is made of candidate data structures to be loaded and stored in the instruction RAM. The selection may be based on factors such as maintaining efficient storage and retrieval in the instruction RAM (where for example there may be an access penalty for data that is not aligned, say, to a 16, 32 or 64 bit boundary in the memory; or where byte or word accesses are not individually possible, so the writing of an individual byte or word may require a read-modify-write cycle of whole words or double words with associated time and performance penalty implications).

Additionally, the data structure may be selected to facilitate detection of available space and to optimally match this with the actual sizes of the components of the data segment in the application.

In one embodiment these components of the data segment are generally divided into candidate data structures according to data which is initialized data (having an initial value when the program first begins), uninitialized data (which has no defined initial value, often referred to as BSS), data which is allocated and de-allocated on demand (referred to as the Heap) and data allocated and de-allocated as temporary storage used for saving and restoring input and output parameters passed to, and results received from, procedure and function calls (known as the Stack).

In one embodiment, only a subset of the data segment components, such as the heap data, is loaded and stored in the instruction RAM, where the size of the heap in the data segment of an application may expand and contract according to the activity of the application and where the instruction RAM may therefore be usefully employed as an extension of the main heap area normally located in data RAM to more flexibly accommodate this expansion and contraction.

DETAILED DESCRIPTION

Figure 5:
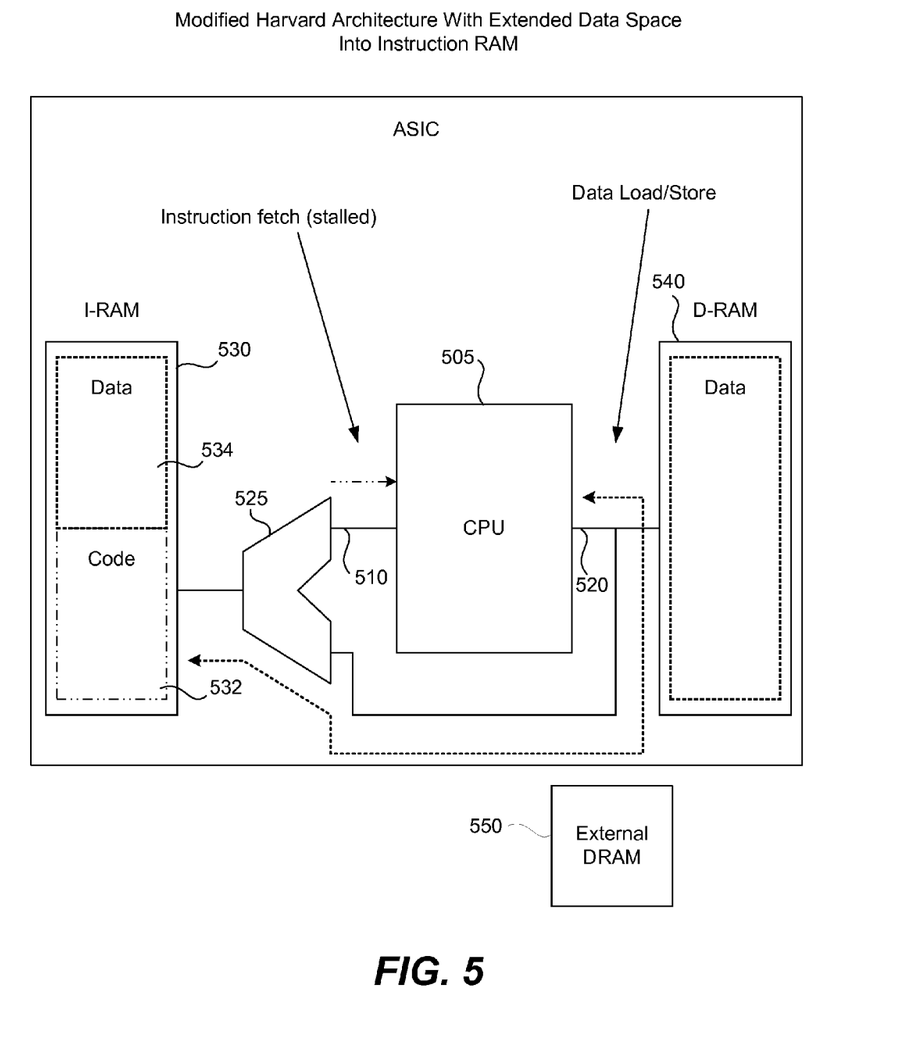
FIG. 5 illustrates operation of a modified Harvard Architecture processor in accordance with an embodiment of the present invention.

FIG. 5 illustrates operation of a modified Harvard Architecture Processor 500 in accordance with an embodiment of the present invention. In one embodiment, it is implemented as an Application Specific Integrated Circuit (ASIC) that includes a central processing unit (CPU) 505, instruction bus 510, data bus 515, data bus 520, arbiter 525, Instruction RAM (I-RAM) 530 and Data RAM (D-RAM) 540. The processor includes buses that can operate independently, such that a fetch of instructions can be carried out in parallel to the reading and writing of data. The arbiter 525 is inserted between the processor and the instruction memory to allow access to the memory from either the instruction bus 510 or data bus 520 (the arbiter will allow access from either, but not both at the same time).

An extended data space is provided into the I-RAM. During normal operation of the processor, there may be unused available memory space in the I-RAM. By unused memory space, it is meant that the code 532 does not use all of the available memory space in the I-RAM such that there is available memory space 534 that may be used for loading and storing data. In an embodiment of the present invention, the size of the unused available memory space in the instruction RAM is determined by the processor, and this available space is used for data load/store operations from/to the I-RAM, thereby extending the address space of the data RAM on the data bus. The I-RAM can be used for dynamic data structures to minimize the number of swaps to external memory 550 (external DRAM), or a fixed component of the data segment, such as the uninitialized data (BSS) or the initialized data may be re-located from the D-RAM to the I-RAM. Swapping out inactive data structures to external memory 550 incurs a significant performance penalty. Therefore if on-chip instruction SRAM 530 is used instead of external DRAM 550 for additional data structures, a significant performance increase can be achieved.

Figure 6:
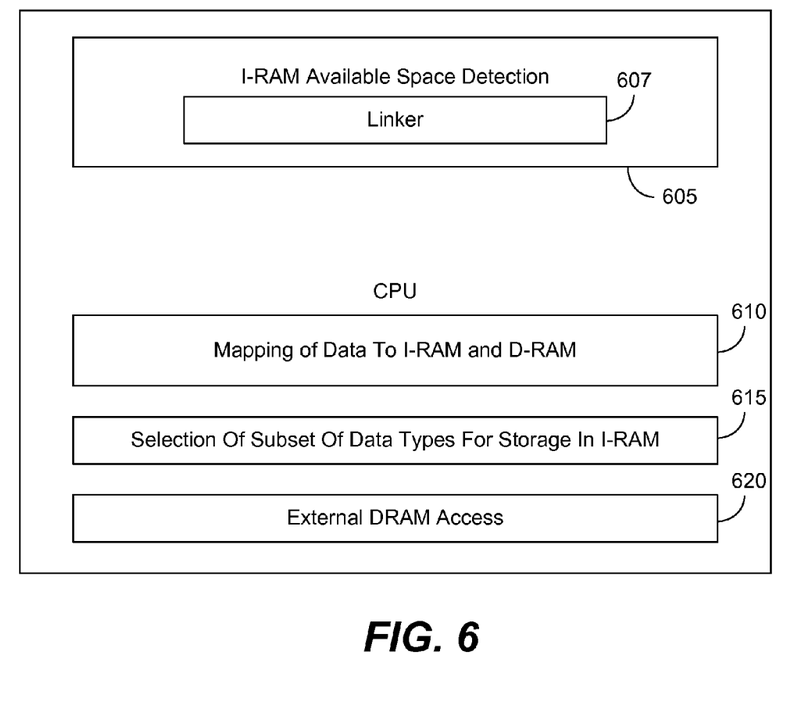
FIG. 6 illustrates an example of modifications to operation of a processor in accordance with an embodiment of the present invention.

FIG. 6 illustrates in more detail selected aspects of operation of a CPU for a modified Harvard Architecture Processor programmed or otherwise configured to leverage available I-RAM typically reserved for the processor program code instructions (i.e. the code segment (also known as the text segment) of an application) as a replacement for that external storage (i.e. external DRAM). Referring to FIG. 6, generally speaking, a module 605 to detect available I-RAM space may be provided. A linker 607 may be used in detecting the available I-RAM space. A mapping 610 of data to I-RAM and DRAM is performed. In one embodiment, the available space in the I-RAM is used as an extension of the DRAM. A selection of data types for storage to the I-RAM is provided 615, which may be determined at some initial time, although more generally this may be optimized based on test results or other techniques. The CPU also includes conventional external memory access 620 to swap out data when the on-chip resources have been exhausted.

Figure 7:
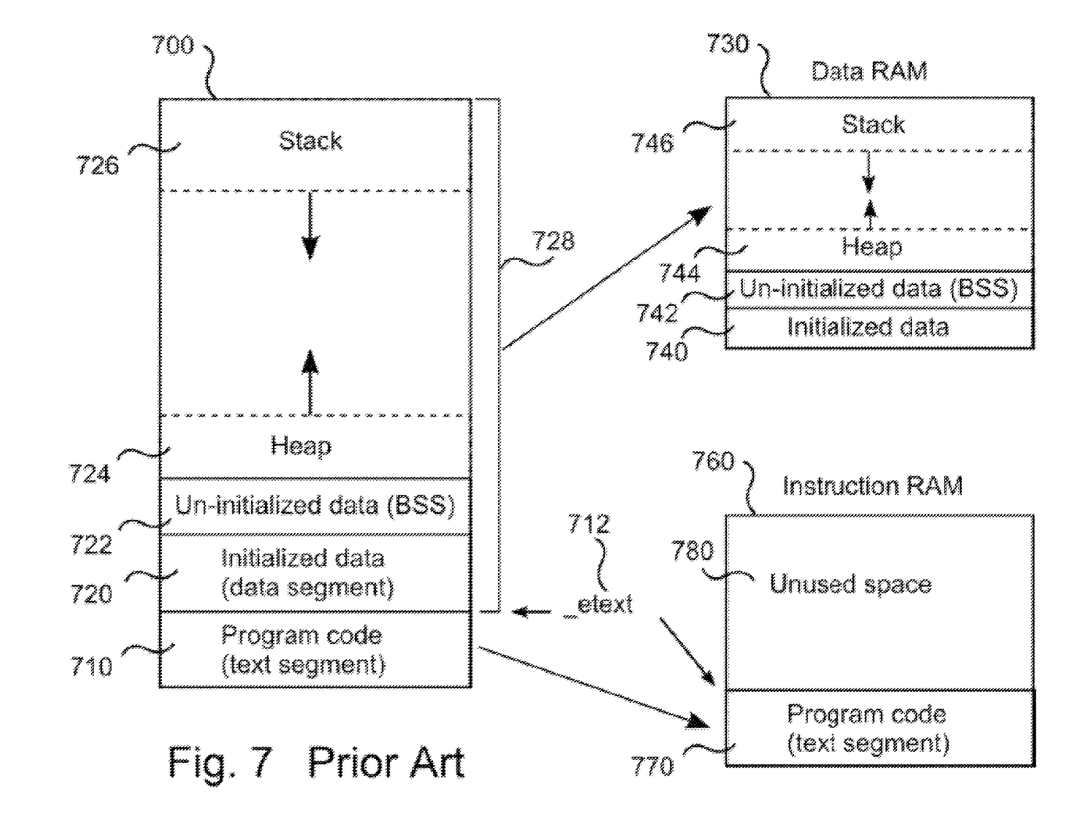
FIG. 7 illustrates the segmented layout of an application and the placement of the code and data components of the code and data segments to the instruction RAM and data RAM in the prior art.

FIG. 7 shows the placement of the components of the code segment 710 and data segment (720, 722, 724 and 726) of an application program 700 into the data RAM 730 and the instruction RAM 760 in the prior art. The code segment 710 of the application is placed into the instruction RAM 760 as program code 770 with an end address indicated by the linker_etext variable 712. The components of the data segment, the initialized data 720, uninitialized data (BSS) 722, Heap 724 and Stack 726 are placed in the data RAM 730 as initialized data 740, uninitialized data (BSS) 742, Heap 744 and Stack 746. There remains unused space 780 in the instruction RAM 760.

Figure 8:
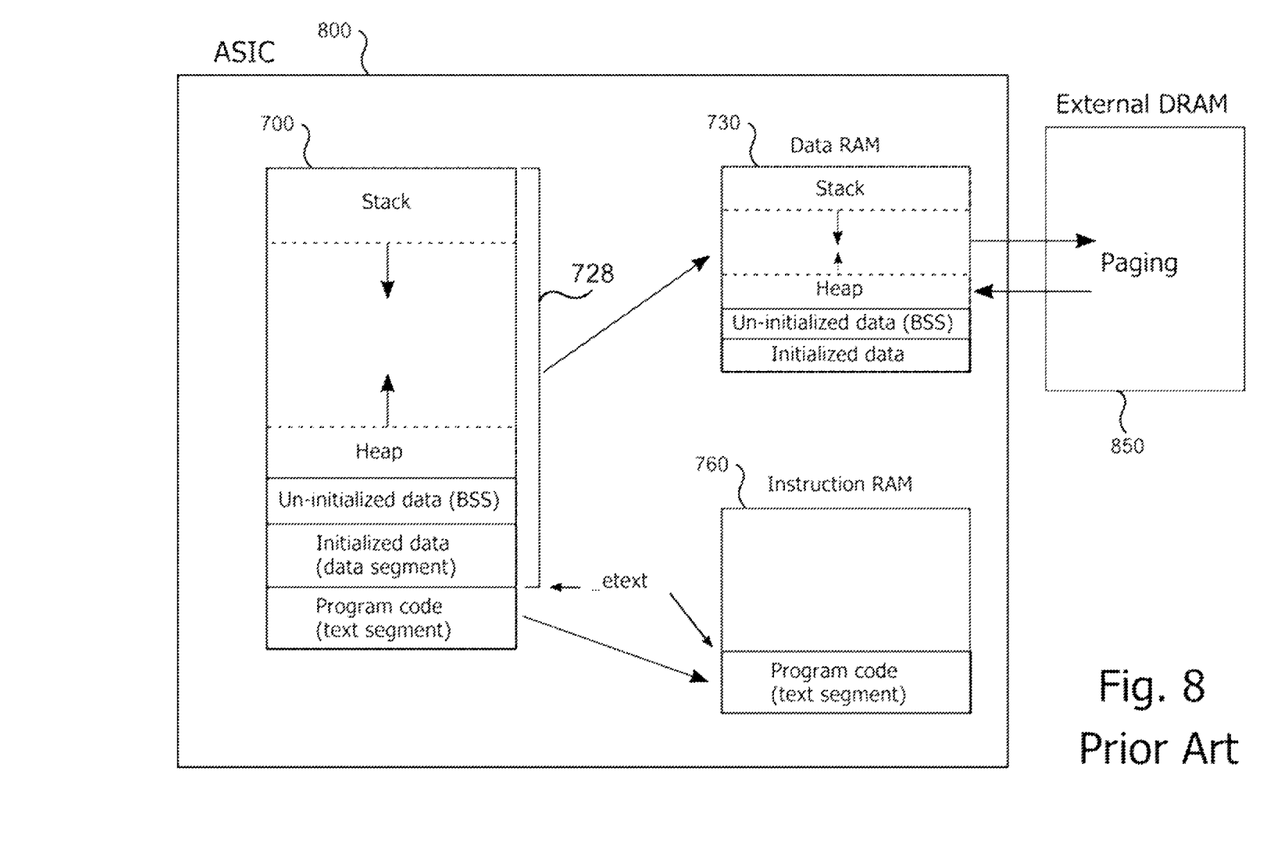
FIG. 8 illustrates the situation in the prior art where the space required in the data segment exceeds the size of the data RAM and where paging to external DRAM is used.

FIG. 8 shows the situation in the prior art where, if the capacity of the data RAM 730 is too small to accommodate the space requirements of the combined components of the data segment 728, paging of data between the external DRAM 850 and the Data RAM 730 will be required.

The detection of available unused space may be performed at run time or during the binary code linking stage to determine the amount of instruction RAM which is used by the application running on the processor core. In one embodiment, a linker defined variable points to the end of the memory area occupied by instructions (i.e. the end of the code/text segment). In this implementation, the linker defines a variable, named_etext[ ] that points to the end of the text segment (where 'etext' is shorter hand for 'end of text segment'). Using this variable, a calculation is made of the amount of instruction RAM that is available for use by an application (For a 64K instruction RAM, this calculation is 64 KiB−64-bit aligned_etext=available unused memory). The linker produces the code segment which is located in the instruction RAM and uses whatever space is left over in the instruction RAM for the placement of data which would otherwise be placed in data RAM or external DRAM.

In one embodiment, performance is optimized by selecting a particular subset of data types to be loaded and stored as data in the instruction RAM rather than using the instruction RAM to store all types of data normally stored in a data RAM. Selecting a subset of data types to be loaded and stored as data in the instruction RAM simplifies monitoring the usage in the instruction RAM and efficiently using the available storage space in the instruction RAM. In one embodiment, the unused available instruction RAM memory space is used to hold a data section as an extension of the heap to allow for additional processor-local data structures without having to swap other portions of the data segment out to external DRAM. In another embodiment, only the initialized part of the data segment is mapped to the instruction RAM while other parts of the data segment, such as BSS (which contains uninitialized variable and data), the heap and the stack, are exclusively mapped to data RAM. In another embodiment, only the un-initialized data (BSS) part of the data segment is mapped to the instruction RAM while the other parts of the data segment are exclusively mapped to data RAM.

Figure 9:
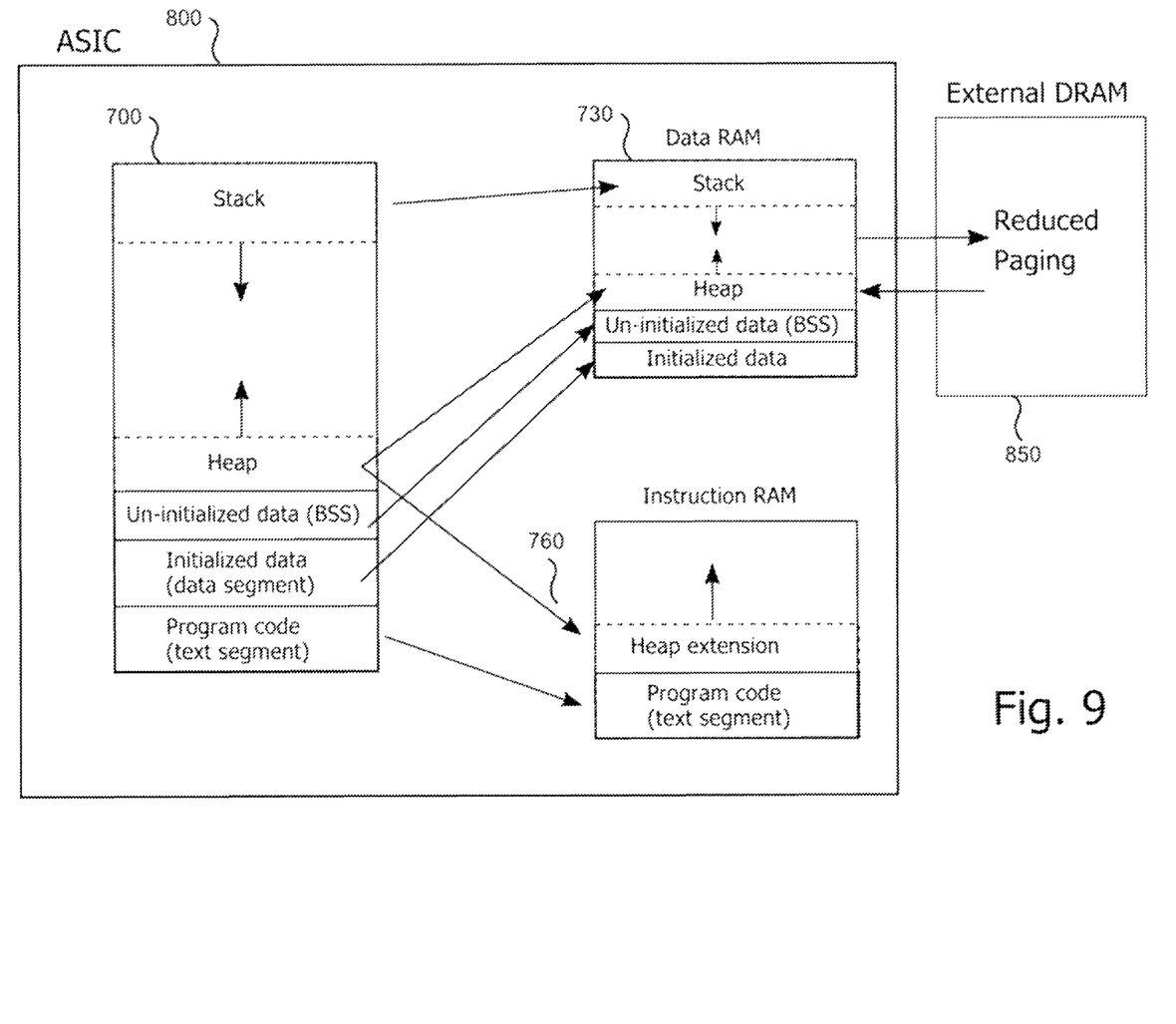
FIG. 9 illustrates the re-location of a component of the data segment to the instruction RAM in accordance with an embodiment of the present invention.

In FIG. 9, an embodiment of the present invention is shown where the unused space 780 is allocated to an Heap extension 760, thereby reducing the amount of paging required to the external DRAM 850. In yet another embodiment, the unused available instruction RAM memory space is used to hold a data section as an extension of the stack to allow for additional procedure and function parameter storage without having to swap other portions of the data segment out to external DRAM.

In the more general case, data requiring storage into a DRAM may be classified into different data types and then a selection is made of the data type(s) that can best be loaded and stored in the instruction RAM in terms of efficiency of storage, ability to detect usage, and minimizing any other performance hits. During operation, a data mapping operation is then performed to map the subset of optimum data types to the instruction RAM.

In one embodiment, the data segment has four sections: initialized data that is mapped to I-RAM; and BSS, heap and stack that is mapped to DRAM. In this example, the initialized data is the only section that is mapped to I-RAM by identifying the end of the code segment which occupies I-RAM using the linker symbol_etext[ ] and knowing by design how large the instruction SRAM is, a calculation can be made at runtime to determine how much I-RAM is unused and thus available. This calculation is then used to appropriately size the data structures to be stored in the unused memory. While in one embodiment this calculation is performed at runtime, more generally the calculation could be run at build time.

There is a very low risk of the data in the instruction RAM being misinterpreted as code for execution. One advantage of this approach is that because all code is linked into a single static binary that is the text section, execution by definition will be limited to only the instruction RAM that is used (i.e. all branch/call instructions are contained within the text section). This helps to protect against improper execution of the text section from the instruction RAM as code. If additional protection is desired, a memory mapped unit (MMU) could be set up to disallow execution of the portion of the instruction RAM being used for data.

This method of operation during normal runtime use of the processor has several aspects. First, studies by the inventors indicate that the penalty associated with an instruction fetch stall in using an instruction RAM in this way during normal use of the processor can be significantly less than the penalty associated with accessing external DRAM to perform a swap.

Additionally, another aspect of embodiments of the present invention is that the unused space of the instruction RAM may be used strategically by selectively storing those data structures best suited for efficient storage in the instruction RAM. An instruction SRAM is often slightly different than a data SRAM in its access semantics. For example, an instruction RAM may support only dword loads and stores, both in size and alignment. Careful selection of eligible data structures to be loaded and stored in the instruction RAM will yield the maximum performance from the unused available memory space of an instruction RAM. As an example, a table of 32-bit entries would be a much better candidate than a table of characters, as the data will be more closely aligned to 64-bit accesses, than a complex data structure with byte and word aligned and sized data. Once the candidate data structures have been selected and relocated to instruction RAM, the previously occupied data RAM is now available for other dynamic data structures.

If the instruction RAM is used for storing both data and code, then arbitration between instruction fetch cycles and data load/store cycles to the instruction RAM will occur, which may cause instruction fetch cycles to stall while a data load/store cycle completes (or vice versa) as there is competition for access to the same resource (the instruction RAM). However, in many implementations, the net effect of the slowdown associating with stalling is much less than the slowdown which would be experienced if the data load/store instructions were to access external DRAM.

Studies were performed on an ASIC having a multi-CPU design with multiple CPU cores based on a Tensilica Xtensa™ design, which have a modified Harvard Processor Architecture. Each core had 64 KiB of data SRAM and 64 KiB of instruction SRAM. The 64 KiB of data SRAM is limiting, as the data and bss sections, the stack, and the heap all must fit in this confined space. Profiling was performed of the design architecture. The general profile metrics were that instruction SRAM was approximately 4× slower than data SRAM (possibly due to bus contention), while external DRAM was approximately 440× slower. As a result, the performance penalty associated with having to go off-chip is extremely high. In this example, there is a significant performance boost to reallocating unused instruction RAM space to data, even though there is a possible bus contention penalty.

Access times were compared between the three available memories: data SRAM, instruction SRAM, and external DRAM. For each memory, data stores, data loads, and combined accesses were each timed and the results compared. The fastest memory by far was data SRAM, and using its access time of 1 as a reference value to base all the other access times, the results were as follows:

Stores: instruction SRAM=4.92, external DRAM=621.70
Loads: instruction SRAM=3.51, external DRAM=317.10
Combined Stores and Loads: instruction SRAM=3.81, external DRAM=410.50

Note that the address mapping of many processor designs, such as that of the Tensilica™ architecture, permits the address spaces for the instruction RAM and the data RAM to be separate and distinct but in ways that permit mapping the instruction RAM into the DRAM load/store memory space. For example the address map may provide distinct memory ranges for data RAM and instruction RAM. Specifically, in one example of a Tensilica™ architecture the data RAM is from address 0x10000000 to 0x1000ffff and instruction RAM is from address 0x20000000 to 0x2000ffff such that both the busses and the address ranges are separate, making the distinction easily discernible.

Various other optimizations may be employed to maximize the available unused instruction RAM. One optimization is to experiment with size optimization (−Os), which reduces the size of the text segment, thus increasing the available instruction RAM. However, this must be balanced carefully as the smaller code segment footprint often results in sub-optimal execution paths which could negate any performance gain created by leveraging the extra instruction RAM made available. Additionally, optimization may be performed around access patterns. For example, if instruction RAM access is optimized at 32-bit aligned addresses, then only 32-bit data structures can be put be in this memory. This type of optimization would be tailored to the I-RAM architecture of the processor on which it was implemented.

One aspect of the present invention is that it provides a performance boost by contradicting the standard practice in the art of always using the instruction RAM to store only instruction code (aside from a few limited testing and verification processes not performed during normal operation). It will be understood that one aspect of achieving a performance boost during normal use of the processor lies in aspects of: the architecture, the application, the relative access times for accessing the on chip instruction RAM vs. external memory, the stall penalty, and the manner in which specific optimum data structures are selected for storage in the instruction RAM. In the above examples, the data SRAM is comparatively small in capacity compared with the application demands and a careful selection of data structures for storage in the instruction RAM is made. For the most general case, one of ordinary skill in the art could run test code or simulations to determine conditions for which a performance boost will be achieved for a specific modified Harvard Architecture.

Conventionally instruction RAM and data RAM are implemented as on-chip SRAM, although it will be understood that equivalent on-chip cache memories that may be developed in the future could be employed instead of SRAM. While examples have been described using a linker to monitor Instruction RAM usage, more generally it will be understood that this is an implementation detail and that other hardware or programming structures could be utilized instead of a linker.

While the invention has been described in conjunction with specific embodiments, it will be understood that it is not intended to limit the invention to the described embodiments. On the contrary, it is intended to cover alternatives, modifications, and equivalents as may be included within the spirit and scope of the invention as defined by the appended claims. The present invention may be practiced without some or all of these specific details. In addition, well known features may not have been described in detail to avoid unnecessarily obscuring the invention. In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

What is claimed is:

1. A method of run-time operation of a modified Harvard Architecture processor in an Application Specific Integrated Circuit (ASIC) having an on-chip instruction RAM for storing program code instructions, an on-chip data RAM (D-RAM), data buses, and an arbiter, comprising:
   detecting an available address space in the on-chip instruction RAM;
   fetching program code instructions from the on-chip instruction RAM during the run-time operation of the modified Harvard Architecture processor;
   loading data in or accessing data from the on-chip data RAM during the run-time operation of the modified Harvard Architecture processor;
   loading data in or accessing data from the available address space of the on-chip instruction RAM as an extension of the data RAM during the run-time operation of the modified Harvard Architecture processor; and
   stalling the fetching of program code instructions from the on-chip instruction RAM during the step of loading data in or accessing data from the on-chip instruction RAM, during the run-time operation of the modified Harvard Architecture processor.

2. The method of claim 1, wherein the available address space is dedicated to load and store only heap data for an application as a replacement for a heap in data RAM.

3. The method of claim 1 wherein the available address space is dedicated to load and store only heap data as an extension of the heap in data RAM.

4. The method of claim 1, wherein the available address space is used to load and store only the uninitialized data portion of an application.

5. The method of claim 1, wherein the available address space is used to load and store only the initialized data portion of an application.

6. The method of claim 1, wherein a linker is used to detect the available address space.

7. The method of claim 1, wherein data is classified into different dynamic data structure types and a subset of dynamic data types is selected for efficient storage in the instruction RAM.

8. The method of claim 1, wherein a penalty for an instruction fetch stall is less than a penalty for accessing an external memory to access data.

9. The method of claim 1, wherein an address map includes separate address ranges for the instruction RAM and the data RAM.

10. The method of claim 1 wherein the available space of the instruction RAM is used as an extension of a stack to allow for additional address space for procedure and function input and output parameter data structures passed on the stack.

11. The method of claim 1, wherein the available address space is used for data structures associated with data load and store instructions.

12. The method of claim 1, wherein the operation of the modified Harvard Architecture processor corresponds to a runtime operation of the modified Harvard Architecture processor.

13. An Application Specific Integrated Circuit (ASIC) comprising:
   a CPU comprising a modified Harvard Architecture processor;
   an on-chip instruction RAM communicatively coupled to the CPU by a first bus;
   an on-chip data RAM for storing program code instructions, the on-chip data RAM communicatively coupled to the CPU by a second bus; and
   an arbiter communicatively coupled between the on-chip instruction RAM and the first bus and the second bus and configured to arbitrate access to the on-chip instruction RAM by the first bus and the second bus;
   the CPU configured to:

detect an available address space in the on-chip instruction RAM during the run-time operation of the modified Harvard Architecture processor;

fetch program code instructions from the on-chip instruction RAM during the run-time operation of the modified Harvard Architecture processor;

load data in or access data from the on-chip data RAM during the run-time operation of the modified Harvard Architecture processor;

load data in or access data from the available address space of the on-chip instruction RAM as an extension of the data RAM during the run-time operation of the modified Harvard Architecture processor; and stall the fetching of program code instructions from the on-chip instruction RAM during the step of loading data or accessing data from the on-chip instruction RAM, during the run-time operation of the modified Harvard Architecture processor.

14. The ASIC of claim 13, wherein the available address space is dedicated to load and store only heap data as an extension of a heap in data RAM.

15. The ASIC of claim 13, wherein the available address space is dedicated to load and store only heap data to replace a heap in data RAM.

16. The ASIC of claim 13, wherein the available address space is dedicated to load and store only initialized data portion of an application.

17. The ASIC of claim 13, wherein the available address space is dedicated to load and store only uninitialized data for an application.

18. The ASIC of claim 13, wherein a linker detects the available address space.

19. The ASIC of claim 13, wherein data is classified into different dynamic data types and a subset of data types is selected for efficient storage in the instruction RAM.

20. The ASIC of claim 13, wherein a penalty for an instruction fetch stall is less than a penalty for accessing the external memory.

21. The ASIC of claim 13, wherein an address map includes separate address ranges for the instruction RAM and the data RAM.

22. The ASIC of claim 13 wherein the available address space is used as an extension of a stack to allow for additional space for procedure and function input and output parameter data structures passed on the stack.

23. The ASIC of claim 13, wherein the available address space is used for data structures associated with load and store instructions.

24. The ASIC of claim 13, wherein the operation of the modified Harvard Architecture processor corresponds to a runtime operation of the modified Harvard Architecture processor.

* * * * *